Patented Jan. 24, 1939

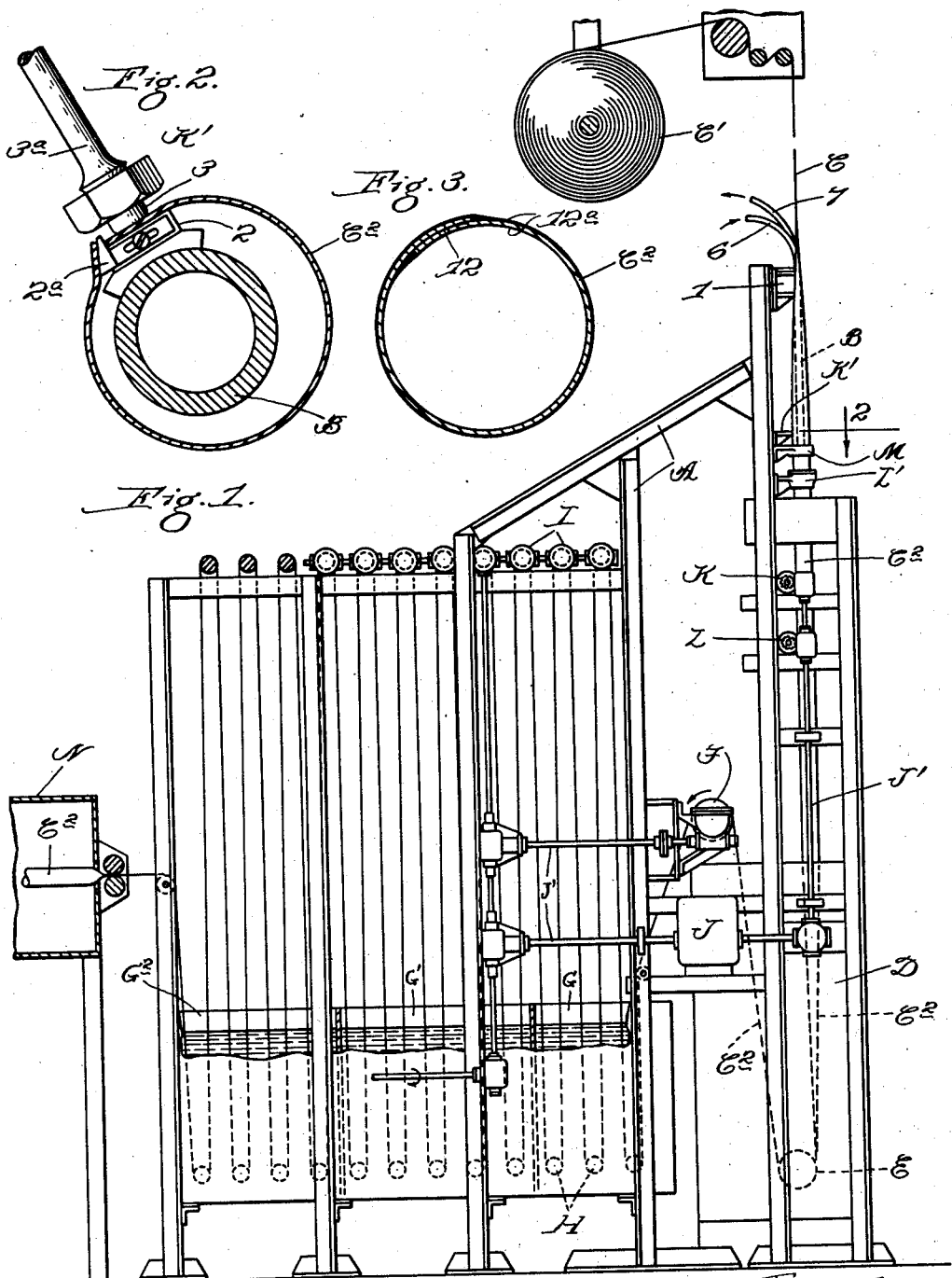

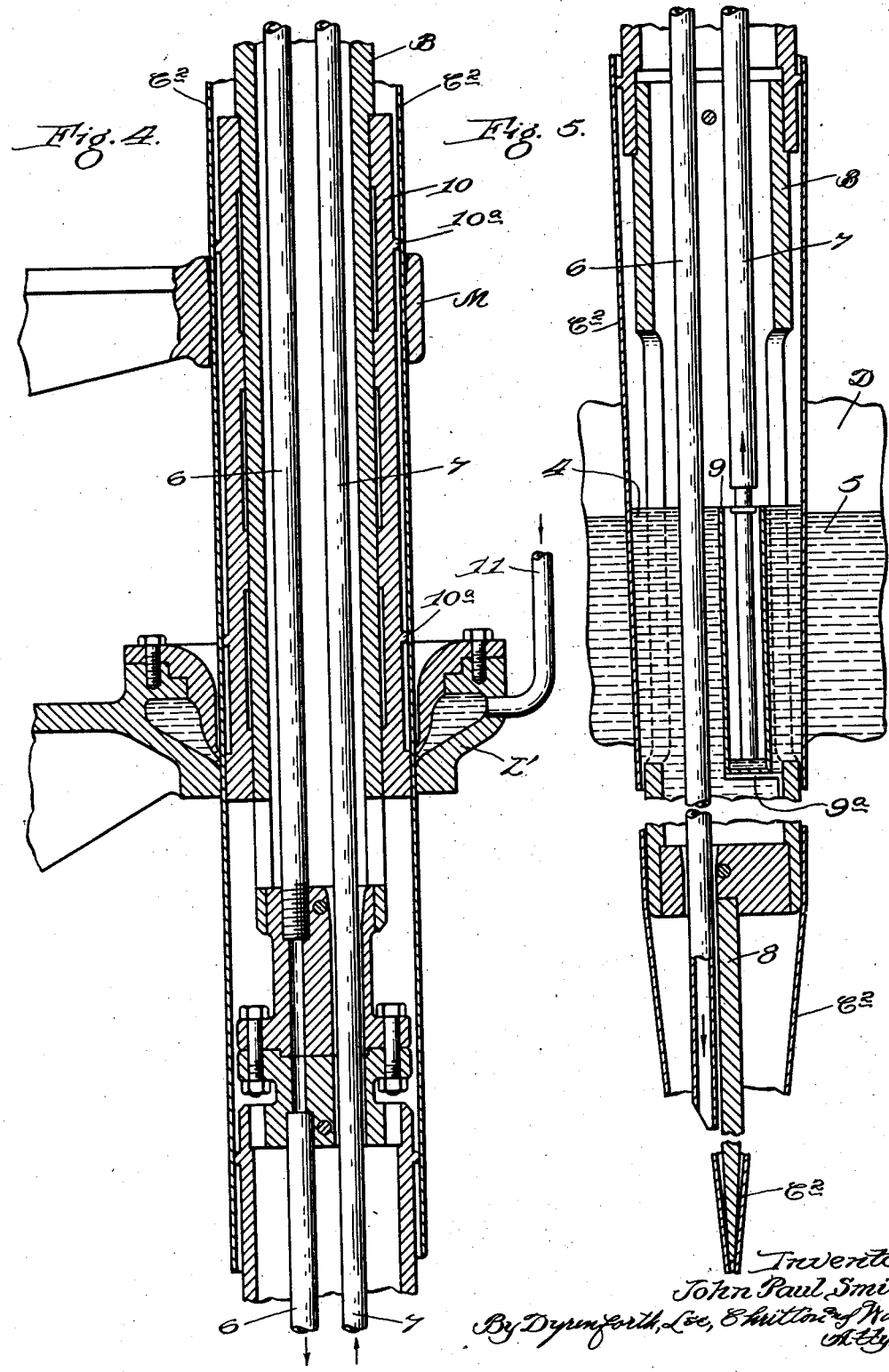

2,144,899

UNITED STATES PATENT OFFICE 2,144,899

METHOD OF MANUFACTURING A TUBE

John Paul Smith, Chicago, Ill., assignor to The Visking Corporation, Chicago, Ill., a corporation of Virginia Application October 3, 1935, Serial No. 43,409

6 Claims. (Cl. 93—94)

The present invention pertains to a fibrous tube coated and thoroughly impregnated with a cellulose ether, the latter serving as a matrix for the fibres of the tube, which matrix is itself a seamless tube of cellulose ether in which the fibres of the fibrous tube employed are imbedded. The invention pertains further to an improved process of manufacturing the improved tube.

In accordance with the present invention, in its preferred practice, a thin, long-fibred paper strip is curved about a longitudinal axis into the form of a tube with overlapping longitudinal margins, the margins are pasted together (preferably with a cellulose ether), and a solution of a cellulose ether or cellulose ether compound is applied to the strip, either before or after it is formed into a tube; and, according to the nature of the cellulose ether employed, the tube is passed through a precipitating bath and subsequently dried, or, where precipitation, as by means of an acid, is not required, the tubing is subjected to a drying operation to remove the organic solvent.

Solutions of cellulose ethers may be prepared by known processes. The cellulose ethers are of two classes, namely: (a) those which are soluble in organic solvents, ethyl-cellulose being an example; and (b) hydroxy-ethyl-cellulose, soluble in aqueous solvents, for example in 6% NaOH solution.

Both classes of ethers can be made, for example, by the treatment of a sodium alcoholate, such as alkali cellulose, with an alkyl halide (or hydroxy-alkyl halide-chlorhydrin.) Among such ethers may be mentioned cellulose ethyl ether, cellulose-hydroxy-ethyl ether, and cellulose-hydroxy-propyl ether.

The hydroxy-ethers of cellulose can be made, also, by combining the anhydride of glycol directly with the alkali cellulose, and solutions thereof, for example, in a weak aqueous solution of sodium hydrate, are suitable for use in the present process. The hydroxy-alkyl ethers of cellulose may be precipitated from such a solution by means of the acids, as is known in the art. Examples of such solutions are: (a) hydroxyethyl ether of cellulose, R—O—CH₂CH₂—OH; (b) hydroxypropyl ether of cellulose,

R—O—CH₂CH₂CH₂—OH;

(c) hydroxyisopropyl ether of cellulose,

R—O—CH₂CH(CH₃)—OH, in which cases, R represents the cellulose radical.

These can be dissolved in aqueous sodium hydroxide and apparently, under these conditions, exist in part as their respective sodium alcoholates.

It is preferred to employ in the present method the hydroxy-alkyl ethers of cellulose, which are soluble in a weak aqueous solution of sodium hydrate and which are precipitable by an acid, such as sulphuric acid, for several reasons: (a) solutions of the hydroxy alkyl ethers may be prepared with greater ease and less expense than those cellulose ethers which are soluble in organic solvents; (b) the present process is simplified by employing the former type; and (c) the resultant product is eminently satisfactory from the standpoint of strength, transparency and other properties which make the improved reinforced tube highly desirable as a container for food products, such as sausage, meat cuts, fruits, etc.

The more highly etherified cellulose compounds which are soluble in organic solvents may be deposited (after the solution has been applied to paper, for example) by removing the solvent by a suitable drying operation. That is, the cellulose ether, in this instance, does not require precipitation in the ordinary sense. However, after the highly etherified cellulose compound has been produced, it may be, before being placed in solution, acidified to remove by-products, washed with water, or with water and acid and then again with water, and then dried. The material may then be placed in solution in a suitable solvent. Among the solvents for the material may be mentioned alcohol, benzol, alcohol-benzol mixture, glacial acetic acid, chloroform, chloroform-alcohol mixture, methyl acetate, methyl alcohol mixture, etc.

The accompanying drawings illustrate the process which is preferred. In this process, a solution of a hydroxy-alkyl ether of cellulose is employed for impregnating and forming a matrix for the fibres of a reinforcing fabric, preferably a long-fibred thin paper; and the paper is formed into a tube, thoroughly impregnated, then passed through a precipitating bath, then through a purifying water bath, then through a water bath containing a small percentage of a hygroscopic agent, such as glycerine, and finally through a drier. The process, thus, is preferably a continuous process by means of which a long length of tubing may be produced; and the tubing may afterward be cut into suitable lengths for use.

In the drawings, which are largely diagrammatic, Fig. 1 is a side elevational view of apparatus suitable for the practice of the improved process, the drier being shown brokenly and in section; Fig. 2, a broken plan sectional view taken as indicated at line 2 of Fig. 1 and illustrating the manner in which seam-paste is applied to one margin of the paper strip; Fig. 3, a sectional view of the improved tubing; Fig. 4, a broken vertical sectional view on an enlarged scale showing a mandrel and attendant parts employed in the apparatus; and Fig. 5, a similar view showing the lower portion of the same mandrel and illustrating its relation to the precipitating bath.

In the illustration given, A designates a frame; B, a tubular mandrel; C, a strip of fabric, such as thin paper, which is taken from a roll C' and formed into a tube C²; D, a precipitating tank into which the mandrel B depends; E, a roller journaled in the lower portion of the tank D, about which the tube passes; F, a driven roll about which the tube passes as it emerges from the bath D; G, a tank which may, if desired, contain additional precipitating liquid; G', a purifying water bath; G², a final water bath containing a small percentage of glycerine; H, a lower series of rolls mounted in the lower portions of the last-mentioned tanks; I, an upper series of driven rolls mounted at considerable distance above the baths; J, a motor which, through the medium of suitable gearing J', drives the feed rolls mentioned and also drives pumps K and L which serve to deliver the cellulose ether solution to a seam-pasting device K' and an annular coating device L', respectively; M, a forming-ring through which the tube passes from the pasting device K' to the coating device L', the margins of the strip being firmly pasted together before the coating device is reached; and N, a drying device through which the tubing is passed continuously after leaving the bath G², it being noted that the section of the tubing passing through the drier is kept in inflated condition by means of an elongated isolated air body which is maintained in that portion of the tubing which is within the drier.

The present application is a continuation in part of my Patent No. 2,105,273, issued January 11, 1938. In that patent, apparatus corresponding with that shown in the drawings of the present application is fully illustrated, described and claimed; hence, it is deemed unnecessary to give more than a cursory explanation of the apparatus in the present application.

The mandrel B is suitably supported by a bracket 1 and depends into the precipitating tank D. The fabric strip C is drawn from the roll C' and passes downwardly about the mandrel and is curved into approximately tubular form, as shown in Fig. 2. The mandrel carries an adjustable member 2 adapted to serve as a bearing for one marginal portion of the strip. The member 2 is equipped with a gauge 2ª which is of suitable form to hold the other margin of the tubing away while paste is being applied to the first-mentioned margin. The device K' is in the form of a hollow head 3 with which communicates a pipe 3ª through which cellulose ether paste is delivered. The head 3 has a flat end surface provided with a slot-like orifice (not shown) through which the paste exudes as the strip passes downwardly between the head and the member 2. The other margin of the paper is then brought into overlapping relation and the tube passes between the mandrel and the forming ring M as shown in Fig. 4, where the pasting of the seam is completed. The tube then passes through the annular coating device L' shown in Fig. 4 and then downwardly through the precipitating bath D and about the roller E. At this point, the tube is flattened and temporarily closed, so that it will support an internal bath 4, as shown in Fig. 5. The bath in the tank D is designated 5. Preferably the liquid heat within the tube C² is such as to counterbalance the external pressure caused by the bath 5. In fact, it is preferred to have the level of the internal bath slightly above that of the external bath.

Precipitating fluid is supplied to the tank D in any desired manner. Precipitating fluid is supplied to the interior of the tubing C² by means of an ingoing tube 6 and an outgoing tube 7. The lower terminus of the tube 6 is slightly below the lower end of the mandrel, as appears in Fig. 5. Attached to the lower end of the mandrel is a blade 8 which tapers downwardly, but which widens downwardly also. The purpose of the blade is to cause lateral extension and flattening of the tube as the tube approaches the roller E shown in Fig. 1.

The lower end of the tube 7 depends into a cup 9 which is supported on a bracket 9ª carried by the mandrel. The upper end of the cup 9 determines the level of the internal bath 4. A vacuum is applied to the tube 7 to continuously withdraw liquid from the internal bath as it overflows into the cup 9.

Details of the construction of the mandrel and attendant parts are unimportant for the purpose of the present application. It may be stated, however, that the section 10 of the mandrel which appears in Fig. 4 is provided with circular ribs 10ª which serve to space the tubing C² from the mandrel. The forming ring M is located slightly below the upper rib 10ª and the bore of the ring is smallest at the central portion, the end portions of the bore flaring. The effect is to apply a wiping pressure to the seam as it passes through the ring M, but without causing the tubing to bind against the mandrel.

Briefly stated, the process is as follows: the strip C passes downwardly about the mandrel and is formed into approximately tubular form. As the tube moves downwardly continuously past the seam-paster shown in Fig. 2, a strip of paste is applied to one margin of the strip, the other margin is then brought into overlapping relation, and the pasting operation is completed while the tube passes through the forming ring M. The tube continues downwardly through the annular paste-applying device L', where a solution of hydroxy-alkyl ether of cellulose is applied. This material is sufficiently fluid to readily coat the external surface of the tubing. A measured supply of material is constantly pumped to the coating-applying device L' through pipe 11. The supply is sufficient to not only thoroughly coat the paper of the tube, but also cause the paper to become thoroughly impregnated. In the interval elapsing while the coated tube is passing from the coating device L' to the bath 5 in the tank D, the paper becomes well saturated with the cellulose ether. The tubing then passes through the precipitating bath 5, which contains a suitable precipitating agent, such as sulphuric acid. During passage of the tubing through this bath, precipitation of the hydroxy alkyl ether of cellulose occurs, that is, the ether compound is precipitated from the solution which was applied to the paper tube. Bearing in mind that the solution contacts and surrounds the individual fibres in the paper, it will be understood that because precipitation occurs in situ, the effect is to form a seamless cellulose ether matrix in which the reinforcing fibre of the paper is uniformly imbedded.

Preferably hydroxy-alkyl cellulose ether is employed as a paste for the joint in the paper tube as well as for forming the seamless matrix which forms a part of the composite tube.

Any suitable precipitating compound may be employed in the bath in the tank D. A bath containing about 5%–12% $H_2SO_4$ and about 10%–15% sodium sulphate (or 10%–20% ammonium sulphate) is very satisfactory. If sulphuric acid shall be employed alone at the outset, sodium sulphate will form until a suitable balance is established.

In my above mentioned patent, the use of viscose in a process of this general character is described, and the product possesses certain advantages over known products. However, the use of cellulose ether, particularly in accordance with the preferred process described above, possesses certain advantages over the viscose process. For example, the dispersion of cellulose as a hydroxy ether, in alkali, is more stable than is cellulose xanthate. Also, in the regeneration of cellulose xanthate, gases are liberated which are toxic and corrosive. In the precipitation of hydroxy ethyl cellulose ether, no gases are formed. The product $NaHSO_4$ is formed, but it is no more corrosive of or injurious to equipment than is $H_2SO_4$.

If one employs, instead of a hydroxy-alkyl ether of cellulose, a cellulose ether of the type which is soluble in organic solvents, the tubing may be formed in the manner already described and impregnation of the tubing may be accomplished in the manner already described. The tubing may then be passed directly, if desired, to a drier, such as the drier N.

For the purpose of producing tubes which are best adapted to serve as sausage casings, containers for meat cuts, containers for fruits, etc., the preferred process described above is recommended. The process which involves the use of cellulose ether in solution in an organic solvent as a means of impregnating a fabric tube is less desirable, both on account of greater difficulty in producing the cellulose ether and because of greater difficulty in obtaining a uniform film or matrix of desired qualities. It may be remarked that casings produced by the latter modification really are not desirable for sausage manufacture for the reason that such casings prevent, in the smoking operation, exit of moisture from the sausage and access to the sausage of the effective ingredients of the smoke.

The coating may be applied to either or both sides of the fibrous fabric, as described in the abovementioned patent. Ordinarily the application of a single coating suffices, since the ether solution will pass readily through the fabric and coat all fibres, so that, in any event, the interior surface, as well as the exterior surface, becomes coated. A less desirable method is to apply the ether coating to the fabric strip before the latter is formed into a tube.

Reference has been made to the use of a final bath containing glycerine. It should be stated that such a step may be used advantageously with respect to a tube impregnated with a hydroxy ether of cellulose, but is of doubtful utility in dealing with a tube impregnated with ethyl cellulose ether, which is insoluble in aqueous solvents. In the case of ethyl cellulose ether, some suitable plasticizer may, if desired, be incorporated in the ether solution to be used for impregnating the paper. For example, it may be desirable to introduce into the solution a small percentage of dibutyl phthalate or tricresylphosphate.

Referring to Fig. 3, the paper tube $C_2$ is shown as having an overlap seam designated 12. The cellulose ether matrix is designated 12$^a$. It may be understood as being practically coincident with the paper fabric, by thickening the wall of the tube, thoroughly imbedding the fibres of the paper, sealing the seam of the tube, and at the same time providing inner and outer coatings for the paper. This will be true, even though the solution be applied (in the required amount) to one surface of the tube only, but, of course, the coating may be thickest on the surface to which the coating is applied.

The foregoing detailed description has been given for clearness of understanding only, and no unnecessary limitations should be understood therefrom, but the appended claims should be construed as broadly as permissible in view of the prior art.

What I claim as new and desire to secure by Letters Patent is:

1. In the manufacture of impregnated tubes, a process which comprises: progressively feeding a continuous thin paper strip and bringing its longitudinal margins into overlapping relation to form a cylindrical tube, impregnating said strip with a solution of cellulose ether, and treating the distended impregnated tubing to deposit the cellulose ether in situ.

2. In the manufacture of impregnated tubes, a process which comprises: continuously feeding through a precipitating medium a cellulose-ether-impregnated fabric strip in tubular form having its longitudinal margins overlapped and pasted together and effecting precipitation of the impregnating material while keeping the tube distended.

3. A process as specified in claim 2, as practiced by employing a hydroxy-alkyl ether of cellulose as the impregnating material.

4. In the manufacture of impregnated tubes, a process which comprises: progressively and continuously feeding through a precipitating medium a fabric strip having its longitudinal margins overlapped, said strip being thoroughly impregnated with a hydroxy-alkyl ether of cellulose, and effecting precipitation of said hydroxy alkyl ether of cellulose while the tube thus formed is distended.

5. In the manufacture of a coated tubing, a process which comprises: progressively and continuously forming a tube from a strip of thin fabric; progressively applying to the tubing as formed a coating comprising a solution of hydroxy alkyl ether of cellulose and effecting impregnation of the fabric; and progressively passing the coated distended and impregnated tube through a precipitating bath.

6. In the manufacture of tubing, a process which comprises: passing a thin-walled vegetable fibre tube impregnated with a solution of an hydroxy alkyl ether of cellulose downwardly through an external precipitating bath which affords a given head while maintaining in said tubing an internal precipitating bath which exerts a head of pressure opposed to that of the external bath.

JOHN PAUL SMITH.